United States Patent [19]

Ishimoto et al.

[11] Patent Number: 4,767,696
[45] Date of Patent: Aug. 30, 1988

[54] LASER INFORMATION RECORDING MEDIUM HAVING AN IMPROVED RECORDING LAYER

[75] Inventors: Coe Ishimoto, Tokyo; Junetsu Seto, Kanagawa; Hiroshi Tomimuro, Tokyo, all of Japan

[73] Assignee: Sony Corporation, Tokyo, Japan

[21] Appl. No.: 918,152

[22] Filed: Oct. 14, 1986

[30] Foreign Application Priority Data

Oct. 11, 1985 [JP] Japan ............................ 60-226403
Jan. 20, 1986 [JP] Japan ............................ 61-009460

[51] Int. Cl.$^4$ .................. G11B 7/24; G01D 9/00; G03C 1/72; G03C 5/16
[52] U.S. Cl. .................. 430/495; 430/19; 430/944; 430/945; 346/135.1
[58] Field of Search .......... 430/270, 495, 21, 945; 346/139.1

[56] References Cited

U.S. PATENT DOCUMENTS 4,618,561 10/1986 Munakata et al. ............... 430/945
4,652,514 3/1987 Abe et al. ....................... 430/495

FOREIGN PATENT DOCUMENTS 0179436 4/1986 European Pat. Off.

OTHER PUBLICATIONS

"Insoluble Monolayers at Liquid-Gas Interface" by G. L. Gaines, 1966, pp. 228-233.

Primary Examiner—Paul R. Michl
Assistant Examiner—Mark R. Buscher
Attorney, Agent, or Firm—Hill, Van Santen, Steadman & Simpson

[57] ABSTRACT

A laser information recording medium comprising a substrate, a reflective layer and a recording layer. The recording layer is made of cumulative sub-layers of J-aggregates of an organic dye having an absorption band in the wavelength range of oscillation of the laser and an anionic film-forming material. The cumulative sub-layers may be formed by the Langmuir-Blodgett thin film method. The recording layer may also consist of a plurality of layers containing organic dyes having different absorption peaks of wavelength in their respective sub-layers. The organic dyes are preferably cyanine dyes of a specific type and the cationic film-forming material is preferably a mixture of at least two members of the group consisting of dioctadecyldimethylammonium chloride, octadecylamine and methyl stearate.

3 Claims, 4 Drawing Sheets

LASER INFORMATION RECORDING MEDIUM HAVING AN IMPROVED RECORDING LAYER

BACKGROUND OF THE INVENTION

1. Field of the Invention

The present invention relates to the art of laser information recording and more particularly to a laser information recording medium with an improved recording layer of organic dyes.

2. Description of the Prior Art

A number of attempts have been made to fabricate laser information recording media using organic dyes. The principle behind the information recording in these media is based on geometric variations of the media caused by application of heat which is generated by the absorption of a laser beam by the dye. However, this type of medium makes it difficult to protect the recording layer sealingly from opposite sides in practical applications. To avoid this diffulty, it is necessary to adopt a complicated structure such, for example, as an air sandwich type structure which in turn makes the recording medium complicated. In these information recording media, it is essential that the geometric variations be in the form of spots having a uniform shape and a fine size. This recording principle used in known recording media is opposite to a tendency toward high density recording which has become increasingly important in recent years. In addition, in order to cause the geometric variations in the medium, it is essential to provide energy for melting and vaporization at a minimum value. The geometric variations involve release of dye molecules from the recording pits, which process does not proceed reversibly.

When organic dye molecules, e.g., cyanine dye molecules, are highly concentrated in an aqueous solution, there appears an absorption band or peak which has a large absorption intensity at a longer wavelength than is the case of a single molecule absorption band and has a very narrow half-amplitude level. There is also an absorption band of a single molecule of the dye, an absorption band of the dimer form at a shorter wavelength, and an absorption band of polymolecular aggregates. This absorption band is called the J-absorption band and is known to derive from aggregates of dye molecules called J-aggregates.

We have found that the J-aggregate dissociates by application of heat and the absorption spectra before and after dissociation vary significantly from each other. We have already proposed in Japanese Patent Application No. 59-149040 a laser information recording medium which comprises a recording layer made of a cumulative film of J-aggregates which are obtained from a cyanine dye of the following formula (I) and arachic (arachidic) acid used as a film-forming material.

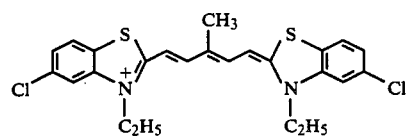

(I)

However, the yield of the J-aggregates in this system was not necessarily satisfactory.

SUMMARY OF THE INVENTION

The present invention provides a laser information recording medium which overcomes the above problems of the prior art and has good characteristics such as high sensitivity, high bit density and reversibility.

In the laser information medium of the present invention, there is a recording layer made of cumulative sub-layers of a specific type of organic dye and a specific type of film-forming material whereby the yield of cumulative sub-layers is improved to almost 100% while having the characteristics mentioned above.

One of the features of the present invention resides in providing a laser information recording medium in which at least two organic dyes having different absorption peaks are used to form a plurality of recording layers of the medium in order to improve the bit density further.

In one embodiment of the present invention, there is provided a laser information recording medium which comprises a substrate, a reflective layer and a recording layer formed on the substrate in the order stated or in reverse order. The recording layer is made of cumulative sub-layers of J-aggregates of an organic dye having an absorption peak of wavelength in the laser beam oscillation band along with a cationic film-forming material, the sub-layers being formed by the Langmuir-Blodgett (LB) thin film method. One of the important features of the present invention resides in providing such a specific type of organic dye having an absorption peak as mentioned above, in combination with a specific type of cationic film-forming material.

DESCRIPTION OF THE PREFERRED EMBODIMENTS

Figure 1:
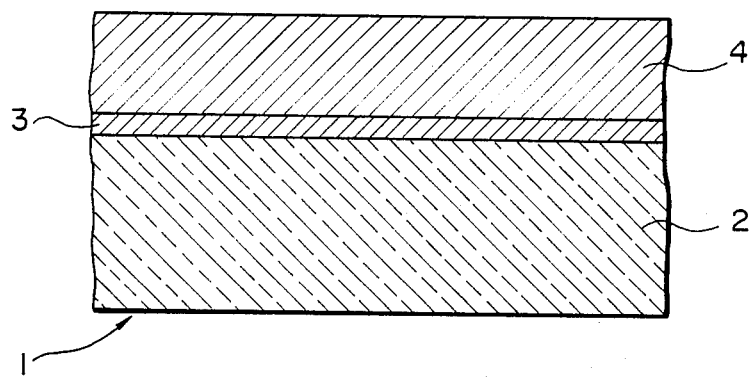
FIG. 1 is a cross-sectional view, greatly enlarged, of a laser information recording medium according to one embodiment of this invention.

The organic dyes useful in accordance with the present invention may be any of the dyes which are capable of forming J-aggregates and have an absorption peak of wavelength in the laser beam oscillation band. Preferred dyes, particularly in combination with an ionic film-forming material described hereinafter, consist of cyanine dyes of the following formulas (II) or (III):

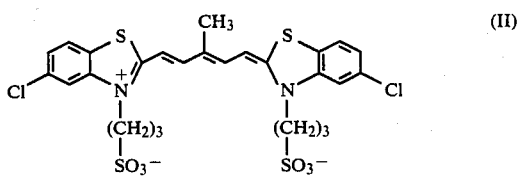

(II)

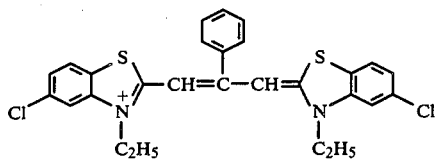
(III)

In combination with the organic dye shown in formula (II) which has a negative charge, the ionic film forming materials to be used are cationic film forming materials.

The cationic film-forming materials used in combination with the above-described organic dyes are mixtures of at least two cationic materials of the group consisting of dioctadecyldimethylammonium chloride (hereinafter referred to as DODAC), octadecylamine and methyl stearate. These materials may be any combination of the three materials such as octadecylamine plus methyl stearate, DODAC and octadecylamine, DODAC and methyl stearate, and DODAC, octadecylamine, and methyl stearate. In addition, arachic acid may be used singly as an anionic film-forming material. When a single recording layer is used, it is preferred that the oganic dye is of formula (II) and the film-forming material is a mixture of octadecylamine and methyl stearate. The cyanine dye and the film-forming material are preferably used at molar ratios of 0.5 to 2 mols of dye to 4 mols of film-forming material.

Preferably, the substrate, reflective layer, and the recording layer should be superposed in the order of either substrate-reflective layer-recording layer or substrate-recording layer-reflective layer. The reflective layer is generally made of Al, Ag, Ni, Cr, W, Ta or similar metal.

When the respective layers of the medium according to the invention are superposed in the order of substrate-recording layer-reflective layer, it is possible to secure information recording in the recording layer which is sealingly protected from opposite sides.

The formation of the cumulative films or sub-layers of the J-aggregates according to the LB method is as follows.

An organic dye and a film-forming material are first dissolved in an organic solvent such as chloroform and/or methanol, and the mixture is dropped.

On a water surface in a vessel, the organic solvent is evaporated and an organic dye and a film-forming material is provided over a water surface to form each monomolecular film. The film is a double layer consisting of a dye monomolecular film as the underlayer and a film-forming monomolecular film as the upper layer. The film is insoluble in water.

After the monomolecular film has been compressed at a particular surface pressure, the substrate consisting of a glass plate or a glass plate covered with a metal layer is inserted vertically into the water surface and pulled up slowly. The monomolecular film of dye and film-forming material is thereby transferred onto the substrate surface in the orientation and arrangement determined by the dye and film-forming molecules. The substrate is moved vertically a desired number of times with respect to the water surface. This procedure is followed to form a cumulative recording layer. The method involved is called the Langmuir-Blodgett method (sometimes called the LB Method).

The recording layer composed of a dye and a monomolecular film of film-forming marterial in the substrate evidences an absorption band which has a larger absorption intensity at a longer wavelength than is the case of a single molecule absorption band and has a very narrow half-amplitude level. This absorption band is called the J-absorption Band and is derived from aggregates of dye molecules called J-aggregates. In this manner, J-aggregates of a specific aggregation state in which dye molecules are oriented and arranged specifically are formed. In the J-aggregates of the dye molecules, the optical absorption spectrum varies greatly according to the fine variation in aggregation state by application of heat. The laser information recording medium of the present invention utilizes a principle of information recording in which the aggregation state of the dye molecules undergoes a fine variation by application of a laser beam.

The recording layer of the laser information recording medium of the invention does not involve release of the dye from the recording pits, so that the recording can be essentially reversible and is thus erasable.

Because the variation in aggregation state of J-aggregates results from several to several tens of dye molecules as one unit, the unit of an information-bearing medium becomes very small, so that recording spots having a uniform shape and a fine size can be obtained with the possibility of high density recording. Since a great geometric variation is not involved in the recording medium, the recording layer can be protected from opposite sides. In practice, the construction of the recording medium can be simplified. Since the recording principle according to the invention is based on a variation of an absorption spectrum according to a fine variation in aggregation state of dye molecules, the energy required for recording becomes small. Thus, high recording sensitivity is provided.

According to another embodiment of the invention, organic dyes having different absorption peaks can be combined in at least two recording layers. For example, the organic dyes of the aforementioned formulae (II) and (III) may be separately contained in two recording layers.

The film-forming material set forth above may also be used in this case, that is, mixtures of at least two of the substances DODAC, methyl stearate and octadecylamine. In addition, arachic acid may also be used. The recording layers containing the respective dyes may be formed similarly to the first embodiment. The excellent performance of the double-layered recording layer will become apparent from the succeeding examples.

The present invention will be more particularly described by way of examples, and reference to the accompanying drawings.

EXAMPLE 1

A cyanine dye having the formula (II), octadecylamine and methyl stearate were dissolved at molar ratios of 1:1:3 in a mixed solvent of chloroform/methanol at a mixing ratio of 4:1 to make a total concentration of stearylamine and methyl stearate of 1 mg/ml. The solution was dropped over a surface of distilled water at 16° C. to develop a monomolecular film, after which a partition plate over the water surface was moved so that the surface pressure was 35 dyne/cm. This monomolecular film was cumulated in 25 layers on a glass substrate 2 having an aluminum reflective layer 3 of about 2000 angstroms in thickness as shown in FIG. 1, using the Langmuir-Blodgett thin film method. This resulted in a laser information recording medium 1 having a recording layer 4 of about 800 angstroms thickness. The reflection and absorption spectra of the medium are indicated in FIG. 2 on the solid line.

Figure 2:
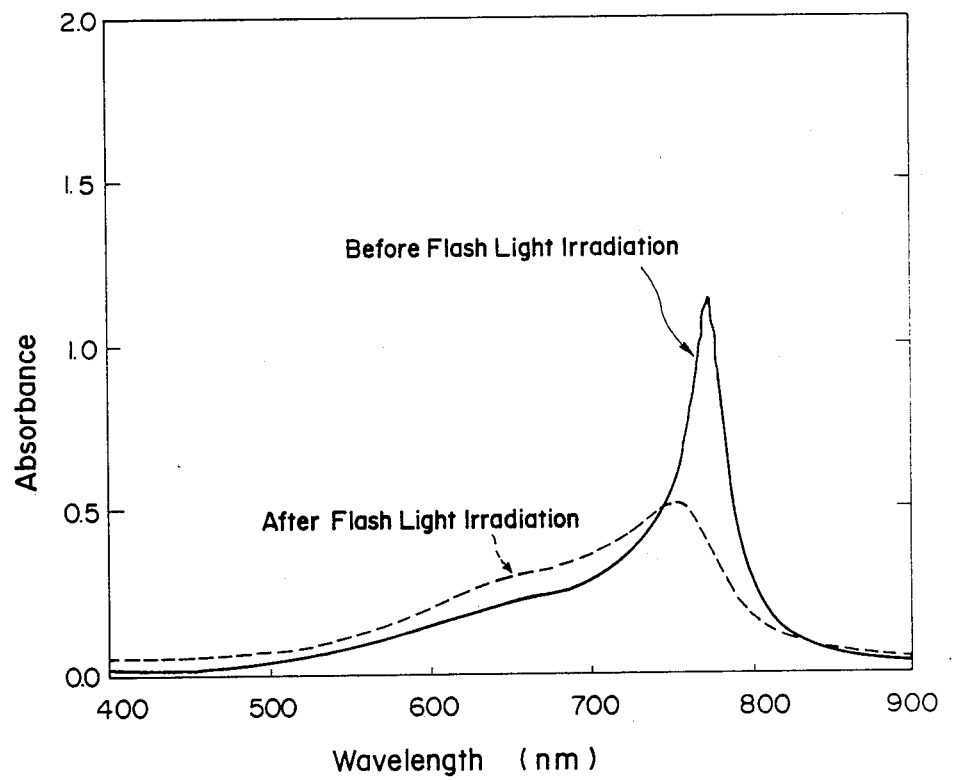
FIG. 2 is a graph of absorption spectra of a laser information recording medium before and after irradiation by a flash of light.

When the medium is instantaneously heated by irradiation with a flash of light, the absorption band changes as indicated by the dashed line of FIG. 2, and has a small absorption peak which indicate a normal dye film. The recording film as it is cumulated evidences a large intensity absorption peak at 780 nm, which is shifted to about a 60 to 90 nm longer wave length from the absorption peak of a normal dye film heated by radiation with a flash of light, and has a very narrow half-amplitude level. Thus, the absorption band at 780 nm is derived from an aggregation state of dye referred to as the J-aggregate.

Figure 3:
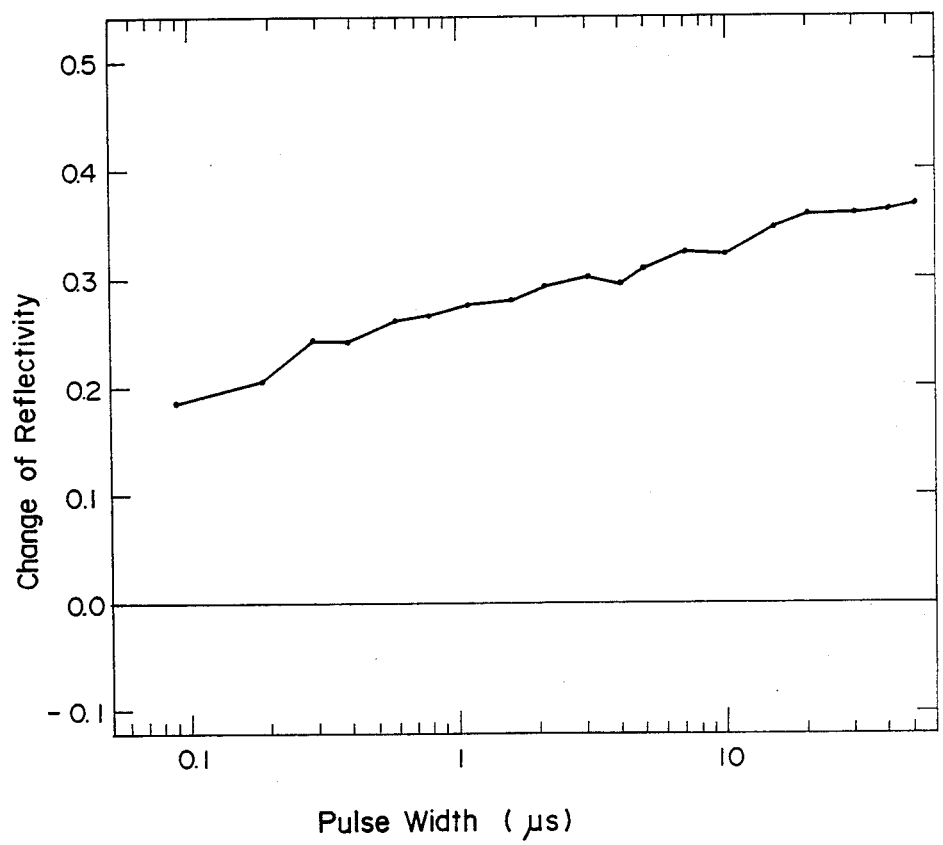
FIG. 3 is a graph showing the variation of reflectivity of the recording medium after irradiation with a flash of light.

The sample was irradiated for writing with a semiconductor laser beam having a wavelength of 780 nm in the form of spots with a diameter of 1.25 microns at a power of 6 mW. The variation in reflectivity is shown in FIG. 3. This variation in reflectivity was determined by measuring the intensities of reflected light before and after the pulse irradiation while decreasing the output power of the laser. As will be apparent from FIG. 3, the variation of the reflectivity at a pulse width of 0.1 microsecond was about 0.2, making it possible to read. Thus, the information recording medium obtained in this example has recording characteristics of high sensitivity.

EXAMPLE 2

Figure 4:
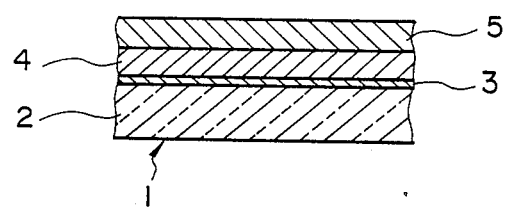
FIG. 4 is a cross-sectional view of a laser information recording medium according to another embodiment of the invention.

As shown in FIG. 4, an approximately 2000 angstrom thick aluminum reflective layer 3 was vacuum deposited on a glass substrate 2, followed by forming a first recording layer 4 and a second recording layer 5 according to the LB method, thereby obtaining a high density information medium.

The recording layer 4 was formed as follows. A cyanine dye of the aforementioned formula (II) DODAC and methyl stearate at molar ratios of 1:1:2 were dissolved in a chloroform/methanol mixture (4:1) in such a way that the total concentration of DODAC and methyl stearate was 1 mg/ml. The resultant solution was dropped over distilled water at 20° C. to develop a monomolecular layer. Then, partition plates were moved for compression so that the surface pressure was 35 dynes/cm. The monomolecular layer was cumulated in 25 sub-layers according to the LB method to form a first recording layer 4 having a thickness of about 800 angstroms. The first recording layer 4 contained the J-aggregates of the dye of formula (II) and had an absorption peak at about 780 nm.

The second recording layer 5 was formed as follows. A cyanine dye of the formula (III) and arachic acid at a molar mixing ratio of 1:2 were dissolved so that the concentration of the arachic acid was 1 mg/ml. This solution was dropped over distilled water at 16° C. to permit a monomolecular layer to develop over the water. Thereafter, partition plates were moved for compression to such an extent that the surface pressure was 30 dynes/cm. The monomolecular layer was cumulated in 6 layers according to the LB method to form a second recording layer 5 having a thickness of about 200 angstroms. The second recording layer 5 had an absorption peak at about 670 nm because of the presence of the J-aggregates of the dye of formula (III).

Figure 5:
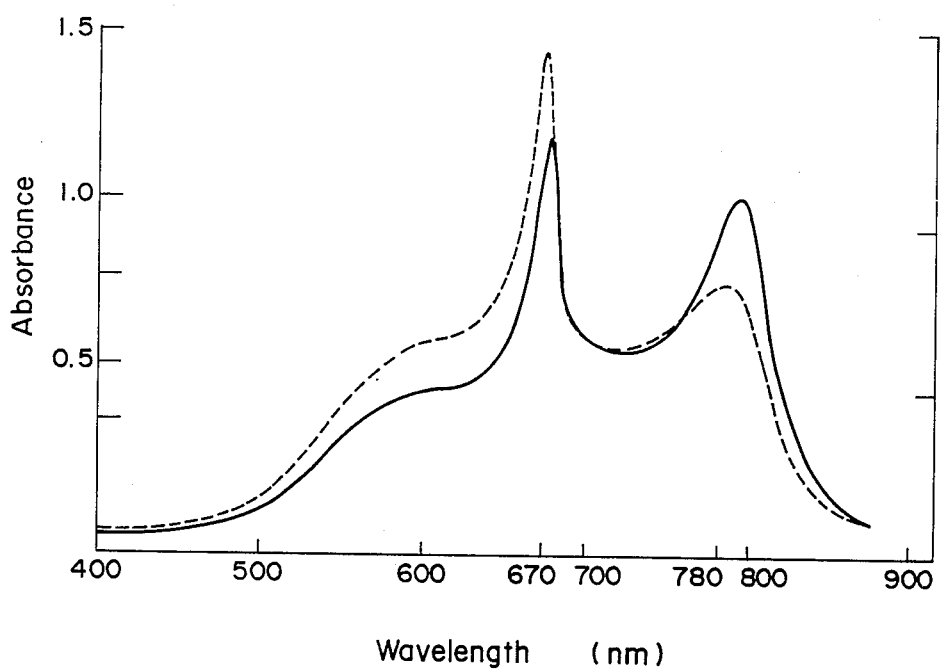
FIG. 5 is a graph showing the relationship between absorbance and variation in absorbance of the recording layer before and after irradiation of a laser beam.

The reflection spectrum of the thus obtained sample prior to irradiation of a laser beam is shown in FIG. 5 as a solid line. In the Figure, the absorption peaks at about 780 nm and 670 nm were based on the first recording layer 4 and the second recording layer 5, respectively.

The recording medium sample obtained in this Example was placed on a disk and written spirally by irradiation with a laser beam which was in the form of a laser spot having a diameter of about 1.6 microns and a wavelength of 780 nm at a laser output of 3.5 mW and a track pitch of 1 micron. The reflection spectrum after writing is shown in FIG. 5 as a broken line.

As will be apparent from FIG. 5, the absorbance at about 780 nm based on the first recording layer alone decreases but the absorbance at about at about 670 nm based on the second recording layer is left unchanged. This means that information can be selectively written in the first recording layer 4. Similarly, it is possible to selectively write laser information in the second recording layer by the use of a laser beam having a wavelength of about 670 nm. Thus, multiple recording can be made on the same portion of the substrate by utilizing the difference in absorbance between the recording layers.

In this example, two recording layers were used but a plurality of recording layers which, respectively, contain organic dyes having different absorption peaks of wavelength can be formed as very thin cumulative recording layers according to the LB method. This permits multiple recording in the same portion of the recording layers with a greatly increased bit density.

It should be evident that various modifications can be made to the described embodiments without departing from the scope of the present invention.

We claim as our invention:

1. A laser information recording medium comprising:
   a substrate,
   a reflective layer, and
   a recording layer, said recording layer consisting of at least one of the following compositions: (1) cumulated sub-layers of J-aggregates formed from a cyanine dye of the following formula:

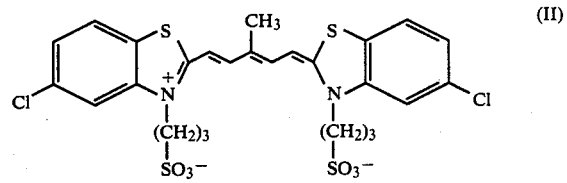

(II)

and at least two film-forming materials from the group consisting of dioctadecyldimethylammonium chloride, methyl stearate and octadecylamine, or (2) cumulated sub-layers of J-aggregates formed from a cyanine dye of the following formula:

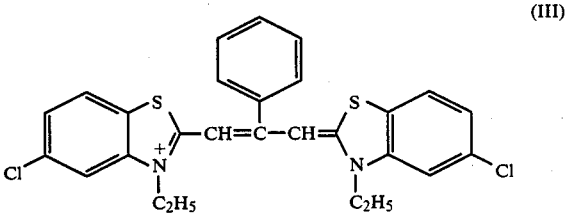

(III)

and a film forming material consisting of arachic acid.

2. A recording medium according to claim 1 wherein said recording layer includes separate layers of both compositions (1) and (2).

3. A recording medium according to claim 1 wherein the film forming material of composition (1) is a mixture of octadecylamine and methyl stearate.